Sept. 30, 1930.     M. M. YALE     1,777,065
AIR PREHEATER
Filed Dec. 5, 1927
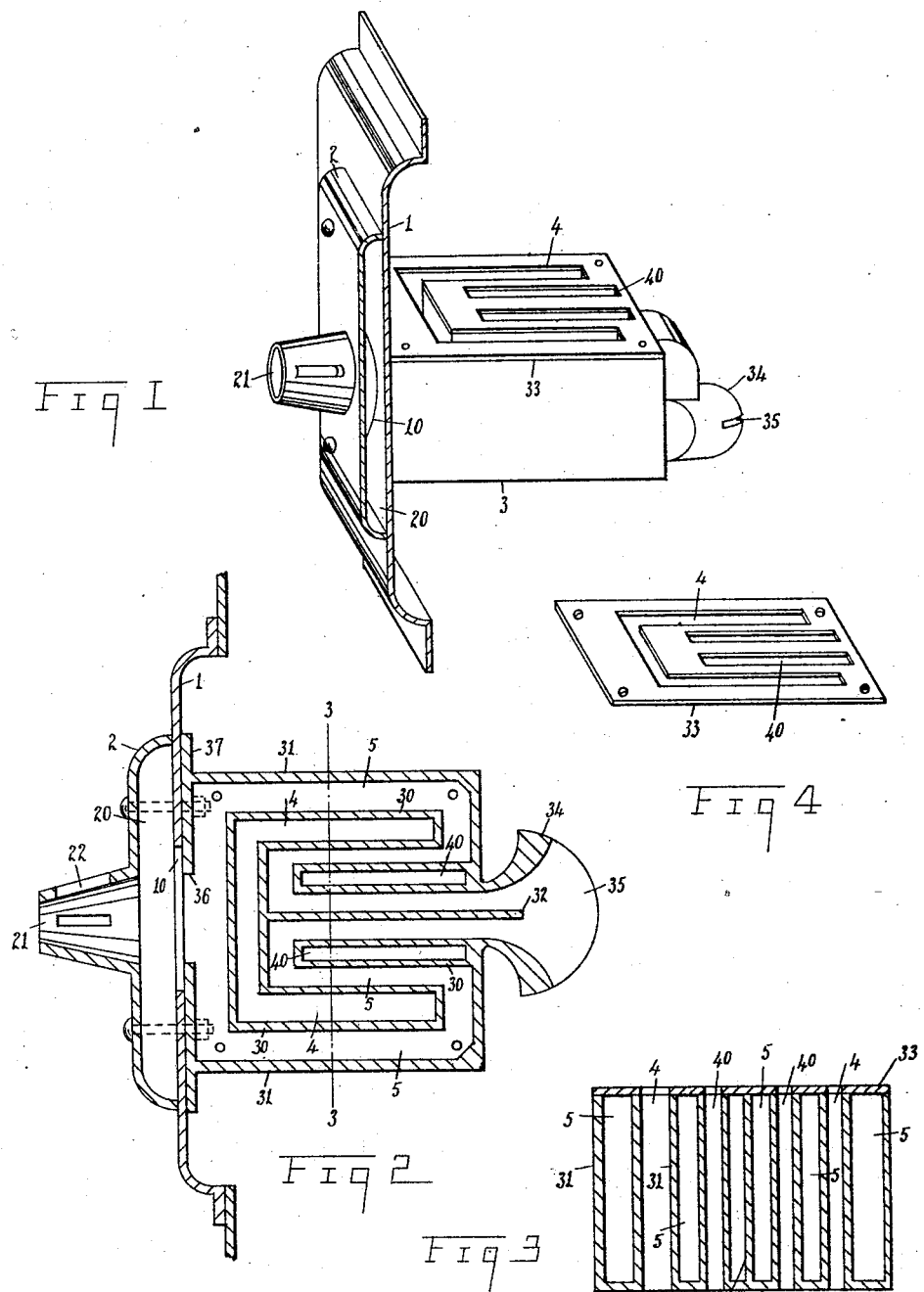
INVENTOR.
MILTON M. YALE.
By
ATTORNEY.

Patented Sept. 30, 1930

1,777,065

UNITED STATES PATENT OFFICE

MILTON M. YALE, OF MONTREAL, QUEBEC, CANADA

AIR PREHEATER

Application filed December 5, 1927. Serial No. 237,810.

This invention relates to means for promoting combustion in furnaces and the like and particularly to means whereby the air is preheated before it reaches the combustion area.

Its object is to promote more complete combustion of the fuel gases and eliminate smoke and thereby obtain the maximum heating effect from the fuel consumed in the furnace.

A further object is to provide a simple, compact and efficient air preheater which can be readily applied to furnaces without alteration and without the aid of skilled labour.

In the description of my invention reference will be made to the accompanying drawings in which:—

Fig. 1 is a perspective view, partly cut away.

Fig. 2 is a central horizontal cross section.

Fig. 3 is a vertical cross section on the line 3—3 of Fig. 2.

Fig. 4 is a view of the removable cover.

The furnace door 1, with its air inlet 10, is fitted with a two part device comprising an outer part 2, providing an air chamber 20, with a central air inlet 21, and side inlets 22, and an inner part consisting of a box shaped casing 3, with a series of vertical partitions 30, therein. These partitions 30, form the walls of vertical heat passages 4 and 40, and of horizontal air passages 5.

The heat passages include the large U-shaped passage 4, and two small passages 40, parallel to the central vertical partition 32.

The partitions forming the walls of these passages are so situated that the air passages become narrower from the inlet to the outlet.

The air passages 5, are two in number, dividing at the aperture 36, and flowing outwardly to the outer walls 31, then along these walls and turning inwardly, and back towards the door end, then turning inwardly and along the central partition 32 to the nozzle 34, with its fan shaped slit outlet 35.

The top plate 33 of the boxed casing 3, is removable, permitting the air passages to be readily cleaned without delay. The front wall of the casing has a central aperture 36, and extends outwardly to form a flange 37, to which the outer part 2 is bolted through holes bored in the furnace door 1.

When this device is mounted on a furnace door and the door is closed, the casing projects into the furnace over the fuel bed, and is exposed to the radiated heat of the burning fuel and to the heat of the gases rising from the fuel bed, some of which pass upwards through the heat passages and thereby heat the walls, the bottom and the top of the casing.

The air entering the inlet is first warmed in the outer chamber and then passes through the apertures to the casing into the passages which are surrounded by heated walls. As it flows onward and absorbs the heat of the surrounding metal surfaces it expands, but owing to the right angle turns of the passages which act as baffles, its speed rapidly increases until it reaches the nozzle and its slit outlet through which it flows as a rapid blast in a fan shaped path over the fuel bed.

This blast of highly heated air spreads and mixes with the fuel gases rising from the fuel bed and produces a highly efficient combustion.

What I claim is:—

1. In an air preheater, a furnace having a door with an air inlet therein, a casing attached to the inside of the door and communicating with said inlet, air passages in the casing leading from the inlet and doubling inwardly on themselves to a central nozzle outlet in the end of the casing, with vertical passages for the passage of combustion gases, through the casing, formed by the walls of the air passages.

2. In an air preheater, a furnace having a door with an air inlet therein, a casing attached to the inside of the door and communicating with said inlet, air passages in the casing leading from the inlet and doubling inwardly on themselves, diminishing in cross section, to a central nozzle outlet in the end of the casing, with vertical passages for the passage of combustion gases, through the casing, formed by the walls of the air passages.

3. In an air preheater, a furnace having a door with an air inlet therein, a casing attached to the inside of the door and communicating with said inlet, vertical partitions in the casing to form horizontal air passages leading from the inlet and doubling inwardly on themselves to a central nozzle outlet in the end of the casing, with vertical passages for the passage of combustion gases, through the casing, formed by the vertical partitions.

4. In an air preheater, a furnace having a door with an air inlet therein, a casing attached to the inside of the door and communicating with said inlet, vertical partitions in the casing to form horizontal air passages leading from the inlet and doubling inwardly on themselves to a central nozzle outlet in the end of the casing, with vertical passages for the passage of combustion gases, through the casing between the bends of the horizontal passages, formed by the vertical partitions.

MILTON M. YALE.